(12) United States Patent
Cheng et al.

(10) Patent No.: US 7,646,525 B2
(45) Date of Patent: Jan. 12, 2010

(54) ELECTRO-WETTING DISPLAY PANEL

(75) Inventors: Chao-Kai Cheng, Hsinchu County (TW); Wan-Wen Chiu, Hsinchu County (TW); Wei-Yuan Cheng, Taipei County (TW); Chung-Wei Wang, Taipei County (TW); Jhih-Ping Lu, Hsinchu Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 72 days.

(21) Appl. No.: 12/120,241

(22) Filed: May 14, 2008

(65) Prior Publication Data

US 2009/0185255 A1 Jul. 23, 2009

(30) Foreign Application Priority Data

Jan. 22, 2008 (TW) .............................. 97102336 A (51) Int. Cl.
*G02B 1/07* (2006.01)
(52) U.S. Cl. .................. 359/245; 359/247; 345/105
(58) Field of Classification Search ................. 359/245, 359/247, 238; 345/105, 107, 84
See application file for complete search history.

(56) References Cited

U.S. PATENT DOCUMENTS 5,956,005 A 9/1999 Sheridon

2009/0058840 A1* 3/2009 Lee et al. .................. 345/204

FOREIGN PATENT DOCUMENTS

WO 2006017129 2/2006

OTHER PUBLICATIONS

Article titled "A Wide-Range, High-Resolution, Compact, CMOS Time to Digital Converter" authored by Ramakrishnan et al., Proceedings of the 19th International Conference on VLSI Design (VLSID'06).
Article titled "A High-Precision Time-to-Digital Converter Using a Two-Level Conversion Scheme" authored by Hwang, et al., IEEE Transactions on Nuclear Science, vol. 51, No. 4, Aug. 2004.

* cited by examiner

*Primary Examiner*—Timothy J Thompson
(74) *Attorney, Agent, or Firm*—Jianq Chyun IP Office (57) ABSTRACT

An electro-wetting display panel including a first substrate, an insulator layer, a second substrate, partitioning structures, and electro-wetting display mediums. The first substrate has a plurality of first electrodes. The insulator layer is disposed on the first substrate to cover the first electrodes. The second substrate located above the first substrate and has a plurality of second electrodes. The partitioning structures are disposed on the insulator layer and each defines a pixel region, respectively. At least one of the partitioning structures has a flow channel surrounding the pixel regions, and the flow channel is connected to one of the pixel regions correspondingly. The electro-wetting display mediums are disposed within the pixel regions and the flow channels. When the electro-wetting display mediums are driven by the electric charge between the first electrodes and the second electrodes, the electro-wetting display mediums move between the pixel regions and the flow channels.

27 Claims, 9 Drawing Sheets

ELECTRO-WETTING DISPLAY PANEL

CROSS-REFERENCE TO RELATED APPLICATION

This application claims the priority benefit of Taiwan application serial no. 97102336, filed on Jan. 22, 2008. The entirety of the above-mentioned patent application is hereby incorporated by reference herein and made a part of this specification.

BACKGROUND OF THE INVENTION

1. Field of the Invention

The present invention generally relates to a display panel, in particular, to an electro-wetting display panel.

2. Description of Related Art

Different types of display panels are constituted based on different display mechanisms. Presently, the most well-known display panels include liquid crystal display (LCD) panels, plasma display panels, field emission display panels, organic light emitting display panels, and electro-wetting display panels, wherein the development of electro-wetting display panels has become much focus because electro-wetting display panels have many advantages in performance and cost, for its high contrast ratio, fast response speed (<15 ms), lower operation voltage, high color presentation, and wide viewing angle etc.

Figure 1A:
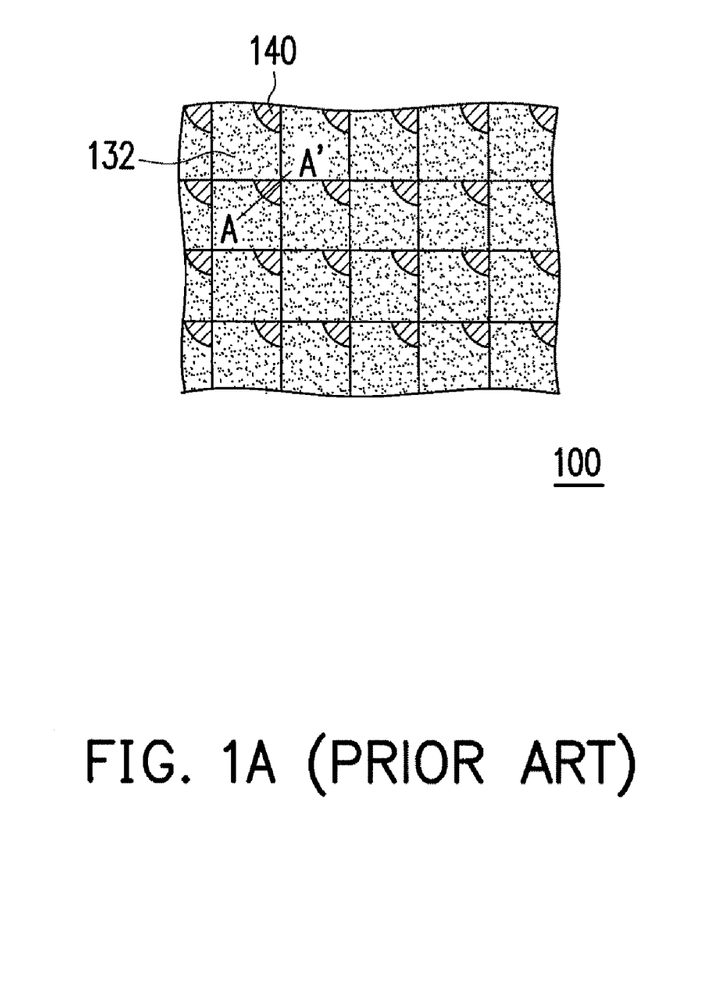
FIG. 1A and FIG. 1B are partial top views of a conventional electro-wetting display panel.
Figure 1B:
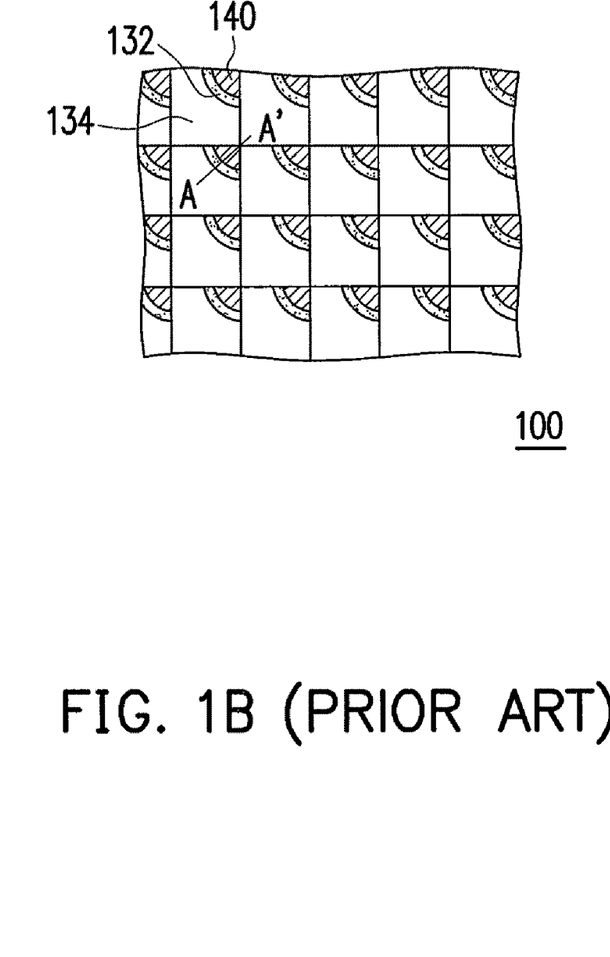
Figure 1C:
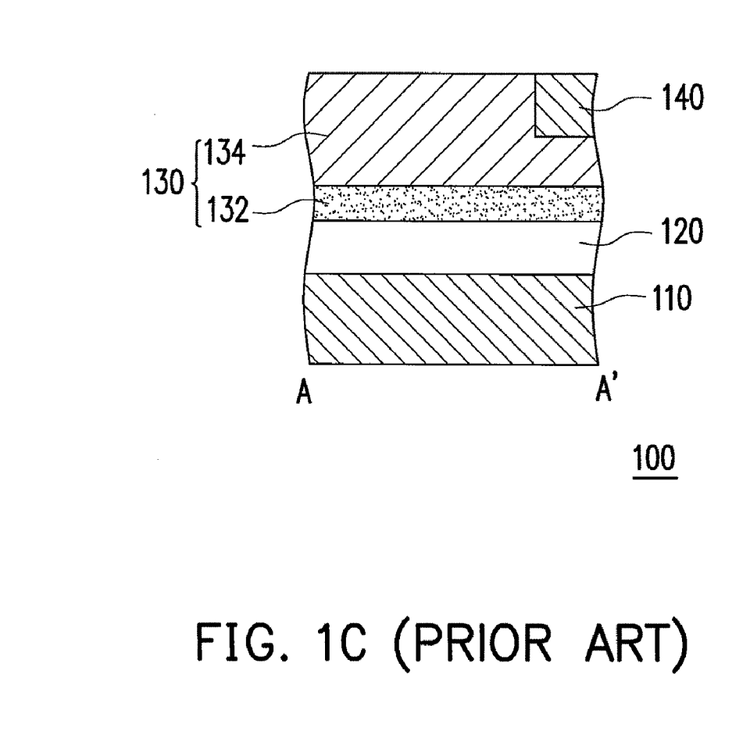
FIG. 1C and FIG. 1D are cross-sectional views of the conventional electro-wetting display panel respectively along line A-A' in FIG. 1A and FIG. 1B.
Figure 1D:
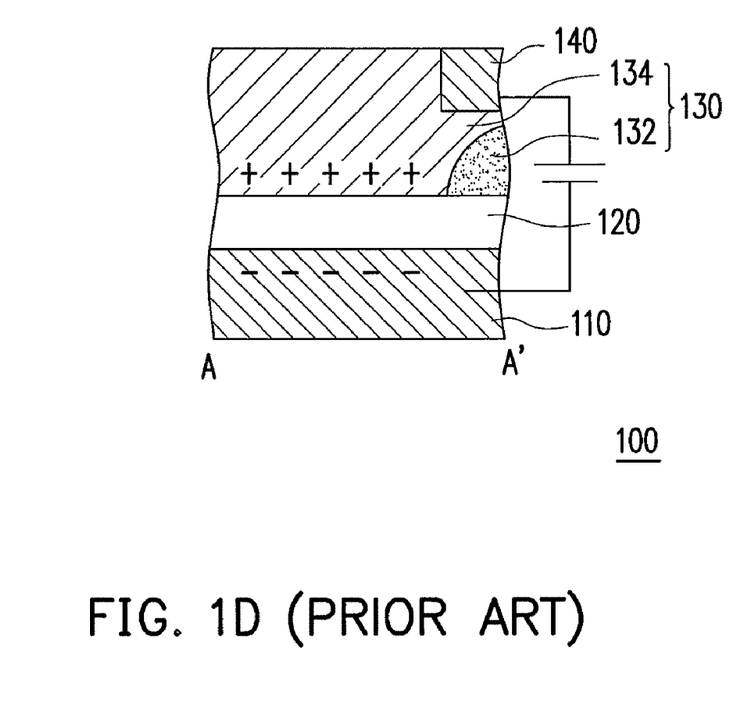

FIG. 1A and FIG. 1B are partial top views of a conventional electro-wetting display panel, and FIG. 1C and FIG. 1D are cross-sectional views of the electro-wetting display panel respectively along line A-A' in FIG. 1A and FIG. 1B. Referring to FIG. 1A and FIG. 1C, the electro-wetting display panel 100 includes a plurality of first electrodes 110, an insulator layer 120 covered above the first electrode 110 in partition structure or layer structure, a plurality of electro-wetting display mediums 130, and a plurality of second electrodes 140. The electro-wetting display mediums 130 include a plurality of color fluid 132 and a colorless fluid 134 to connect with said second electrode. The insulator layer 120, the color fluid 132, and the colorless fluid 134 are disposed between the first electrodes 110 and the second electrodes 140, as shown in FIG. 1A and FIG. 1C. When a voltage bias supply between the first electrodes 110 and the second electrodes 140, an electric field is produced between the first electrodes 110 and the second electrodes 140 and which results in partial charge accumulation on the colorless fluid 134. Accordingly, the surface tension of the colorless fluid 134 is changed so that the color fluid 132 is forced to move along the insulator layer 120, which overlaps between the first electrodes 110 and the second electrodes 140, as shown in FIG. 1B and FIG. 1D. Generally speaking, the pushing effect is referred as an electro-wetting effect. The move behaviour dominance depends on the relative physical properties of the colorless fluid 134 and color fluid 132.

When the conventional electro-wetting display panel 100 is driven, the color fluid 132 is forced to move to the corner of pixel between the first electrodes 110 and the second electrodes 140. In general, the color fluid 132 accumulated at the corners occupies parts of the display area, the conventional electro-wetting display panel 100 is hard to provide high aperture ratio and contrast ratio.

Besides, the traditional panel structure is easy to cause the color fluid 132 random move because of the symmetric electrode within pixel, and it results the non uniform in optical performance, or called the mura. Since the symmetrical makes the color fluid cannot always flows along a predetermined direction, and presents in a random move. In other words, the color fluid may burst away when it flows along different directions and accordingly residue may occur in pixels. In the present invention, the movement of the color fluid is restricted by the boundary of the partitioning structure or partition so that the color fluid can only flow towards specific directions because of the pressure difference, when charges are accumulated thereon, and accordingly burst-away of the color fluid is prevented.

SUMMARY OF THE INVENTION

Accordingly, the present invention is directed to an electro-wetting display panel with high aperture ratio and high display contrast.

The present invention is directed to an electro-wetting display panel which allows the color fluid to move towards a predetermined direction so as to improve the stability of driving and get high uniformity.

The present invention provides an electro-wetting display panel including a first substrate, an insulator layer, a second substrate, a plurality of partitioning structures, and a plurality of electro-wetting display mediums. The first substrate has a plurality of first electrodes. The insulator layer is disposed on the first substrate to cover the first electrodes. The second substrate located above the first substrate has a plurality of second electrodes. The insulator layer is disposed between the first electrodes and the second electrodes and provides electric capacitance accumulation effect. The partitioning structures are disposed on the insulator layer, and each of the partitioning structures respectively defines a pixel region. In addition, at least one of the partitioning structures has a flow channel surrounding the pixel regions, and the flow channel is connected to one of the pixel regions correspondingly. The electro-wetting display mediums are located in the pixel regions and the flow channels. When the electro-wetting display mediums are driven by the first electrodes and the second electrodes, the electro-wetting display mediums flows between the pixel regions and the flow channels.

The present invention provides an electro-wetting display panel including a first substrate, an insulator layer, a second substrate, a partition, and a plurality of electro-wetting display mediums. The first substrate has a plurality of first electrodes. The insulator layer is disposed on the first substrate to cover the first electrodes. The second substrate located above the first substrate has a plurality of second electrodes. The insulator layer is disposed between the first electrodes and the second electrodes and provides electric capacitance accumulation effect. The partition is disposed on the insulator layer and defines a plurality of pixel regions and a plurality of common reservoirs, wherein the common reservoirs are connected to at least two pixel regions. The electro-wetting display mediums are located within the pixel regions. When the electro-wetting display mediums are driven by the first electrodes and the second electrodes, the electro-wetting display mediums flow between the pixel regions and the common reservoirs.

In an electro-wetting display panel provided by the present invention, the plurality of partitioning structures or the partition is disposed to form flow channels or common reservoirs so that the color fluid moves only towards a predetermined direction due to the restriction of the boundaries of the partitioning structures or the partition when the color fluid is driven by charges. Moreover, when the electro-wetting display panel is driven, it offers high aperture ratio, high image contrast ratio, and high driving stability.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

First Embodiment

Figure 2A:
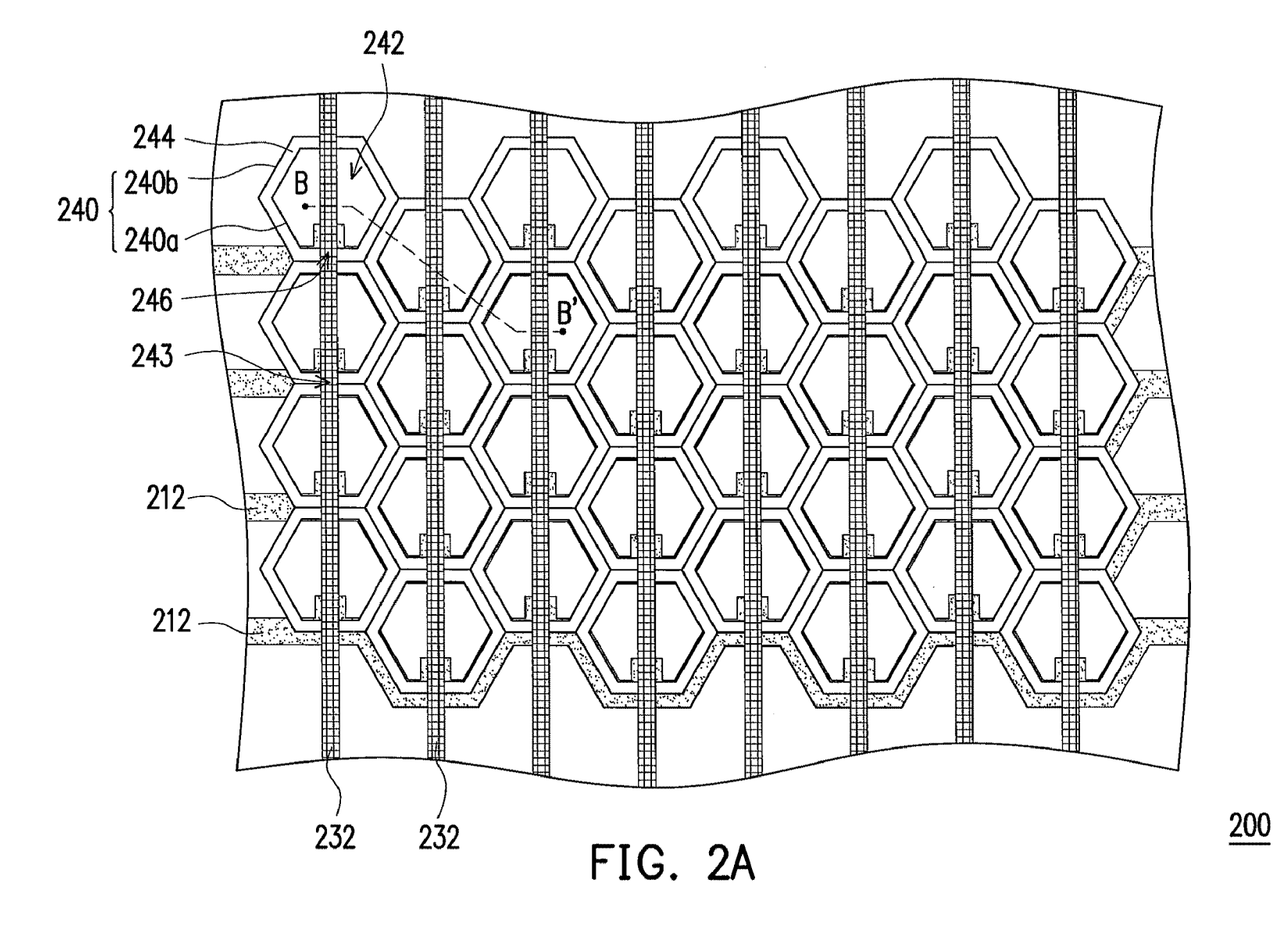
FIG. 2A is a partial view of an electro-wetting display panel according to a first embodiment of the present invention.
Figure 2B:
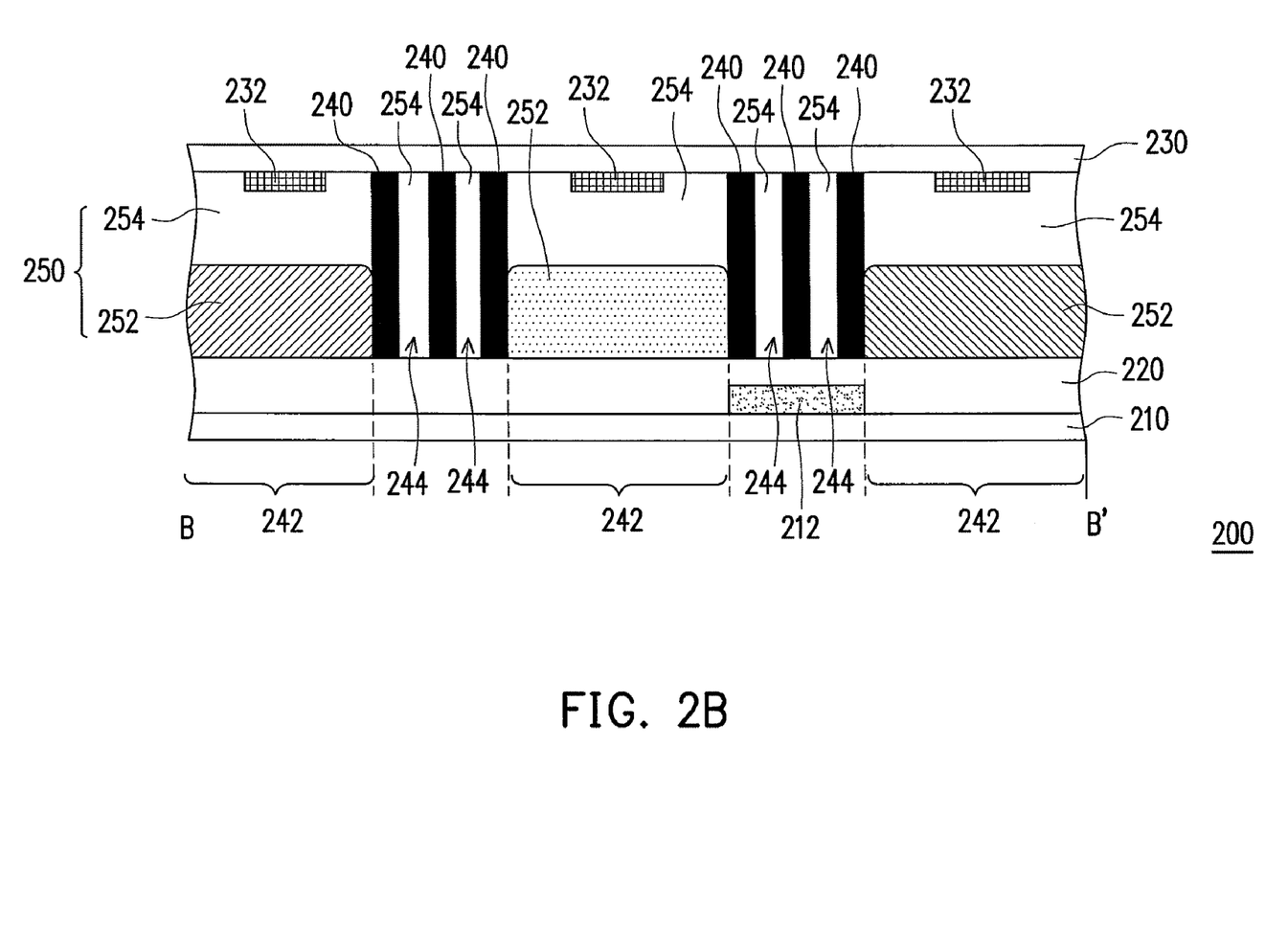
FIG. 2B is a cross-sectional view of the electro-wetting display panel in FIG. 2A along line B-B'.

FIG. 2A is a partial view of an electro-wetting display panel according to the first embodiment of the present invention, and FIG. 2B is a cross-sectional view of the electro-wetting display panel in FIG. 2A along line B-B'. Referring to FIG. 2A and FIG. 2B, in the present embodiment, the electro-wetting display panel 200 includes a first substrate 210, an insulator layer 220, a second substrate 230, a plurality of partitioning structures 240, and a plurality of electro-wetting display mediums 250. The second substrate 230 is located above the first substrate 210, and the insulator layer 220, the partitioning structures 240, and the electro-wetting display mediums 250 are disposed between the first substrate 210 and the second substrate 230, as shown in FIG. 2B.

As shown in FIG. 2A and FIG. 2B, the first substrate 210 has a plurality of first electrodes 212. In the present embodiment, the first electrodes 212 may be transparent electrodes, reflective electrodes, or transflective electrodes. Generally speaking, the electro-wetting display panel 200 is designed as a reflective display panel. Thus, the first electrodes 212 are designed as reflective electrodes, and the material thereof is usually aluminium. However, the first electrodes 212 may also be reflective electrodes made of other materials. Besides, in order to improve the aperture ratio of the electro-wetting display panel 200 or when the electro-wetting display panel 200 is other types of display panel (for example, a transmissive display panel or a transflective display panel), the first electrodes 212 may also be transparent electrodes or transflective electrodes. In other words, the first electrodes 212 may be made of different material according to different design requirements, and the material of the first electrodes 212 is not limited in the present invention.

The second substrate 230 has a plurality of second electrodes 232. In the present embodiment, the second electrodes 232 may be made of the same or different material as the first electrodes 212. For example, when the electro-wetting display panel 200 is a reflective display panel, the first electrodes are usually designed as reflective electrodes, and in order to increase the aperture ratio of the electro-wetting display panel, the second electrodes are usually designed as transparent electrodes. Transparent electrodes are usually made of indium tin oxide (ITO), indium zinc oxide (IZO), or other transparent conductive materials. However, the material of the second electrodes is not limited in the present invention.

The insulator layer 220 is disposed on the first substrate 210 to cover the first electrodes 212, and the insulator layer 220 is disposed between the first electrodes 212 and the second electrodes 232 and has a capacitance accumulation effect. To be specific, when a bias is supplied between the first electrodes 212 and the second electrodes 232, an electric field is produced between the first electrodes 212 and the second electrodes 232 and which results in partial charge accumulation on the electro-wetting display mediums 250. Accordingly, a capacitance accumulation effect is produced. In the present embodiment, the insulator layer 220 is a hydrophobic insulator layer, wherein the hydrophobic insulator layer may be made of fluoropolymer; however, the present invention is not limited thereto, and the insulator layer may also be made of other hydrophobic insulative materials.

In the present embodiment, the partitioning structures 240 are disposed on the insulator layer 220, and the partitioning structures 240 are also disposed between the insulator layer 220 and the second substrate 230. Each of the partitioning structures 240 defines a pixel region 242, wherein at least one of the partitioning structures 240 has a flow channel 244 surrounding the pixel regions 242, and the flow channel 244 is connected to one of the pixel regions 242 correspondingly. To be specific, the partitioning structure 240 having the flow channel 244 includes an internal partitioning structure 240a and an external partitioning structure 240b. The internal partitioning structure 240a defines foregoing pixel region 242 and has an aperture 246. The external partitioning structure 240b surrounds the internal partitioning structure 240a so as to define the above-mentioned flow channel 244 between the internal partitioning structure 240a and the external partitioning structure 240b, wherein the flow channel 244 is connected to the pixel region 242 through the aperture 246. In addition, the interconnections 243 between the flow channels 244 and the pixel regions 242 are located at the overlaps between the first electrodes 212 and the second electrodes 232. In the present embodiment, the number of the interconnections 243 is greater than 1, while in another embodiment of the present invention, the number of the interconnections 243 may also be 1. It should be noted that the partitioning structure 240 is hydrophilic partitioning structure.

In addition, the electro-wetting display mediums 250 are located within the pixel regions 242 and the flow channels 244, wherein the electro-wetting display mediums 250 include a color fluid 252 and a colorless fluid 254. The color fluid 252 is disposed on the insulator layer 220, and the colorless fluid 254 is in contact with the color fluid 252, as shown in FIG. 2B. When the electro-wetting display mediums 250 are driven by the first electrodes 212 and the second electrodes 232, the electro-wetting display mediums 250 flow between the pixel regions 242 and the flow channels 244. To be specific, in the present embodiment, when a bias is supplied between the first electrodes 212 and the second electrodes 232, the color fluid 252 is driven by the first electrodes 212 and the second electrodes 232 therefore flows between the pixel regions 242 and the flow channels 244. The color fluid 252 is a hydrophobic color fluid, and the colorless fluid 254 is a hydrophilic colorless fluid. In the present embodiment, the hydrophobic color fluid may be ink containing pigment or dye, while in another embodiments of the present invention, the hydrophobic color fluid may also be a liquid crystal material having light-scattering characteristic. Besides, the hydrophilic colorless fluid may be water, water solution, or consolute solution containing solvents. In the present embodiment, the hydrophilic colorless fluid is water; however, the present invention is not limited thereto. It should be noted that the ink may be in a single color or different colors (for example, red, green, or blue); however, the color of the ink is not limited in the present invention.

The structure and driving method of the electro-wetting display panel 200 in the present invention will be described in detail.

Figure 3A:
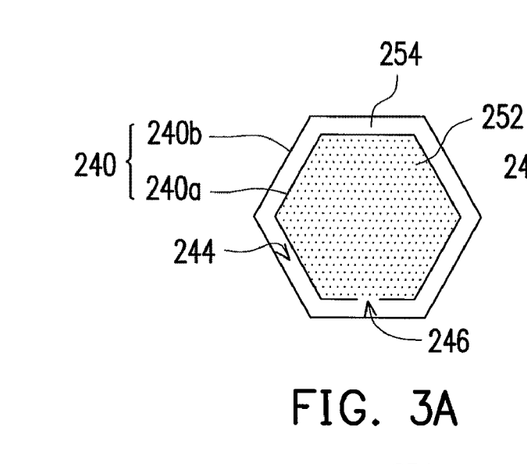
FIGS. 3A~3E are flowcharts illustrating how pixel regions are driven according to the first embodiment of the present invention.
Figure 3B:
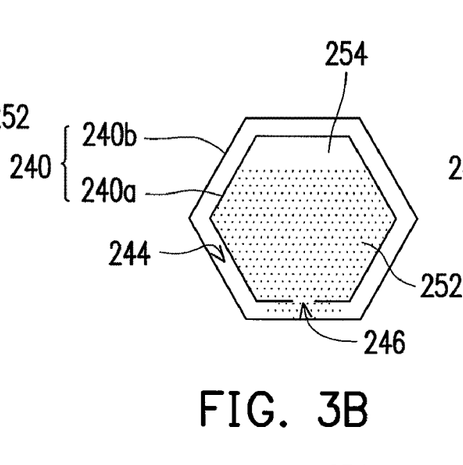
Figure 3C:
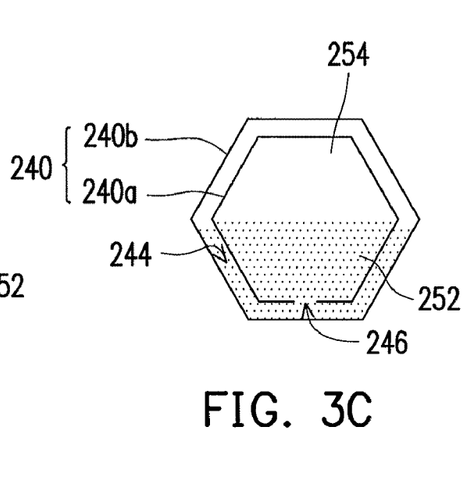
Figure 3D:
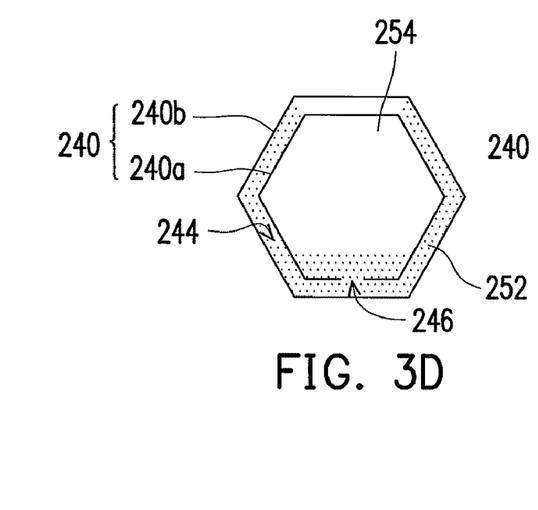
Figure 3E:
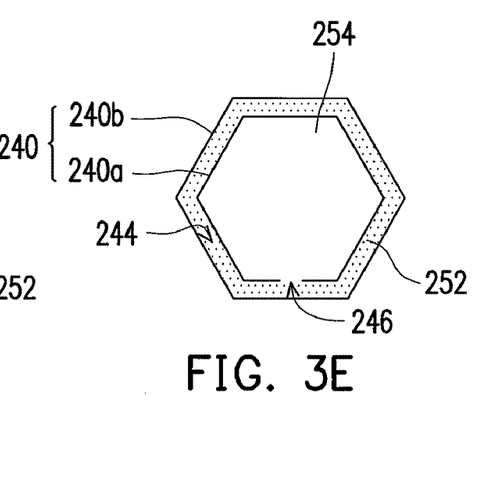

FIGS. 3A~3E are flowcharts illustrating how the pixel regions in the first embodiment are driven. First, referring to FIG. 3A, when the electro-wetting display panel 200 is not driven, namely, when no bias is supplied between the first electrodes 212 or the second electrodes 232, the color fluid 252 in the pixel regions 242 fills up the entire pixel regions 242 and is in contact with the insulator layer 220. Additionally, the colorless fluid further fills up the entire flow channel 244 besides being located above the color fluid 252, as shown in FIG. 2B and FIG. 3A. Next, referring to FIG. 2A and FIGS. 3B~3E, when the electro-wetting display panel 200 is driven, an electric field is produced at the interconnections 243 between the flow channels 244 and the pixel regions 242 (i.e. the overlaps between the first electrodes 212 and the second electrodes 232). Thus, partial charge accumulation is caused on the colorless fluid 254 and accordingly the surface tension characteristic of the colorless fluid 254 is changed so that the color fluid 252 in the pixel regions 242 is pushed to the interconnections 243. The pushing effect is usually referred as an electro-wetting effect. Besides, because the color fluid 252 receives a pushing force towards the interconnections 243 and the interconnections 243 are connected to the flow channels 244 though the aperture 246, the color fluid 252 flows towards the flow channels 244 though the aperture 246 and fills up the flow channels 244, as shown in FIG. 3E. In the present embodiment, the capacity of the flow channels 244 is sufficient for accommodating the color fluid 252. It should be noted that the color fluid 252 further receives an attraction produced by the capillarity effect of the flow channels 244 besides the pushing force produced by the electro-wetting effect.

In the present embodiment, a design of flow channels surrounding the pixel regions is adopted in the electro-wetting display panel 200 such that the color fluid flows between the pixel regions and the flow channels when the electro-wetting display panel 200 is driven. Compared to the conventional technique, the electro-wetting display panel 200 having flow channels surrounding the pixel regions offers better aperture ratio and higher image contrast ratio. Moreover, the electro-wetting display panel 200 allows the color fluid 252 to move towards a predetermined direction so that the stability of pixel driving is improved.

Second Embodiment

Figure 4A:
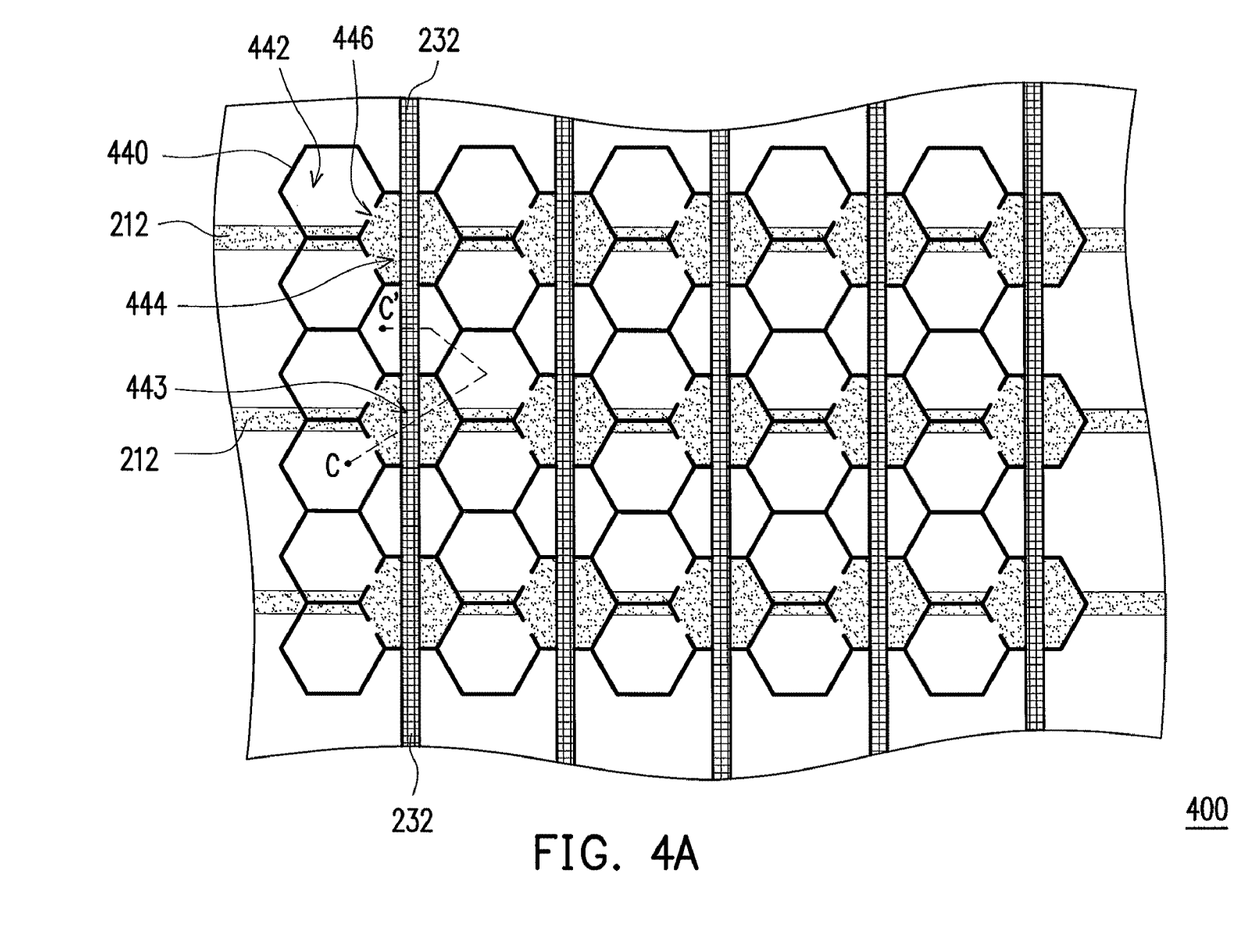
FIG. 4A is a partial view of an electro-wetting display panel according to a second embodiment of the present invention.
Figure 4B:
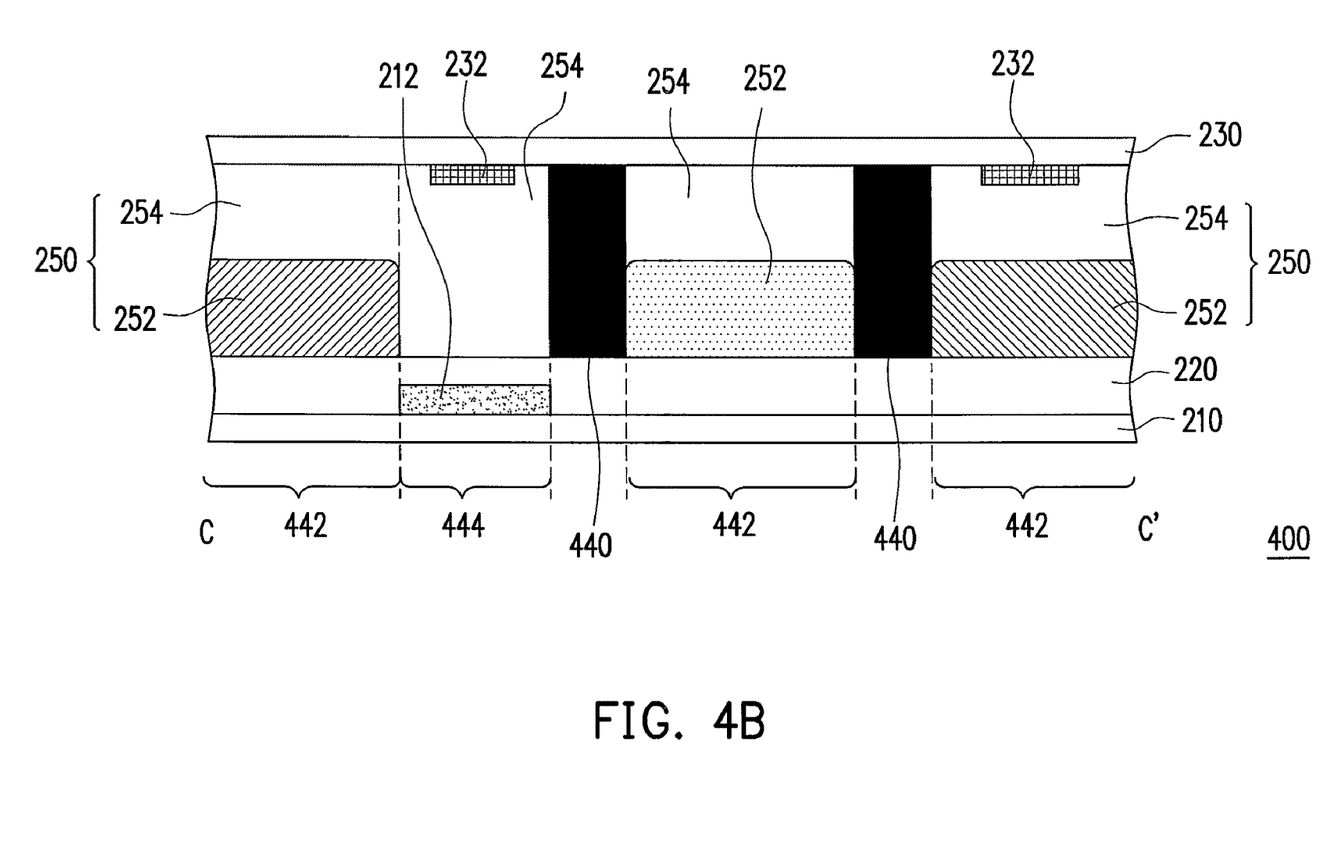
FIG. 4B is a cross-sectional view of the electro-wetting display panel in FIG. 4A along line C-C'.

FIG. 4A is a partial view of an electro-wetting display panel according to the second embodiment of the present invention, and FIG. 4B is a cross-sectional view of the electro-wetting display panel in FIG. 4A along line C-C'. Referring to FIG. 4A and FIG. 4B, the electro-wetting display panel 400 has similar structure as the electro-wetting display panel 200, wherein like reference numerals refer to like elements. The difference between the two electro-wetting display panels is that the electro-wetting display panel 400 has a partition 440 and the partition 440 is different from the partitioning structures 240 in the electro-wetting display panel 200. The insulator layer 220, the partition 440, and the electro-wetting display mediums 250 are disposed between the first substrate 212 and the second substrate 232, as shown in FIG. 4B. In addition, the dispositions of the first electrodes 212 and the second electrodes 232 of the electro-wetting display panel 400 are different from those of the electro-wetting display panel 200, as shown in FIG. 2A and FIG. 4A.

To be specific, the partition 440 is disposed on the insulator layer 220 and is located between the insulator layer 220 and the second substrate 230, wherein the partition 440 is a hydrophilic partition. Besides, the partition 440 defines a plurality of pixel regions 442 and a plurality of common reservoirs 444. The partition 440 located around the common reservoirs 444 has at least two apertures 446, and the common reservoirs 444 are connected to the pixel regions 442 through the apertures 446, as shown in FIG. 4A. It should be noted that the interconnections 443 between the common reservoirs 444 and the pixel regions 442 are located at the overlaps between the first electrodes 212 and the second electrodes 232.

The electro-wetting display mediums 250 are disposed within the pixel regions 442. As described in the first embodiment, the electro-wetting display mediums 250 include a color fluid 252 and a colorless fluid 254. The color fluid 252 is disposed on the insulator layer 220, and the colorless fluid 254 is located above the color fluid 252 and is in contact with the color fluid 252, as shown in FIG. 4B. When the electro-wetting display mediums 250 are driven by the first electrodes 212 and the second electrodes 232, the electro-wetting display mediums 250 flow between the pixel regions 240 and the common reservoirs 250. To be specific, in the present embodiment, when a bias is supplied between the first electrodes 212 and the second electrodes 232, the color fluid 252 is driven by the first electrodes 212 and the second electrodes 232 to flow between the pixel regions 242 and the common reservoirs 250. As described in the first embodiment, the color fluid 252 is a hydrophobic color fluid, and the colorless fluid 254 is a hydrophilic colorless fluid. In the present embodiment, the hydrophobic color fluid may be ink containing pigment or dye, while in another embodiment of the present invention, the hydrophobic color fluid may also be a liquid crystal material having light-scattering characteristic. Besides, the hydrophilic colorless fluid may be water, water solution, or consolute solution containing solvents. In the present embodiment, the hydrophilic colorless fluid is water; however, the present invention is not limited thereto. It should be note that the ink may be in a single color or multiple colors (for example, red, green, or blue); however, the color of the ink is not limited in the present invention.

The structure and driving method of the electro-wetting display panel 400 in the present invention will be described in detail.

Figure 5A:
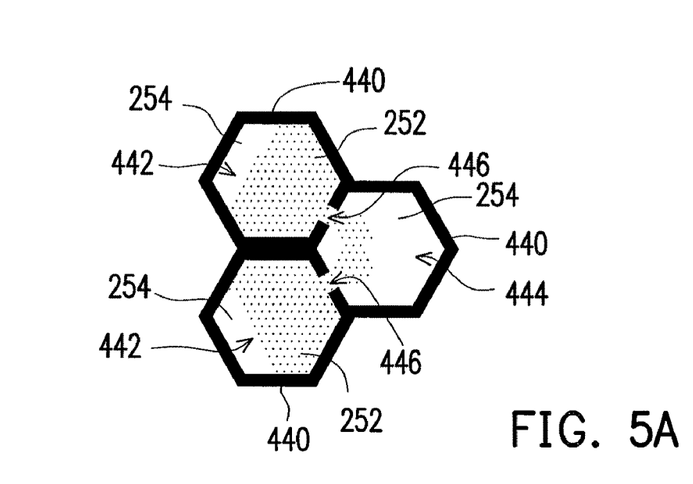
FIGS. 5A~5D are flowcharts illustrating how pixel regions are driven according to the second embodiment of the present invention.
Figure 5B:
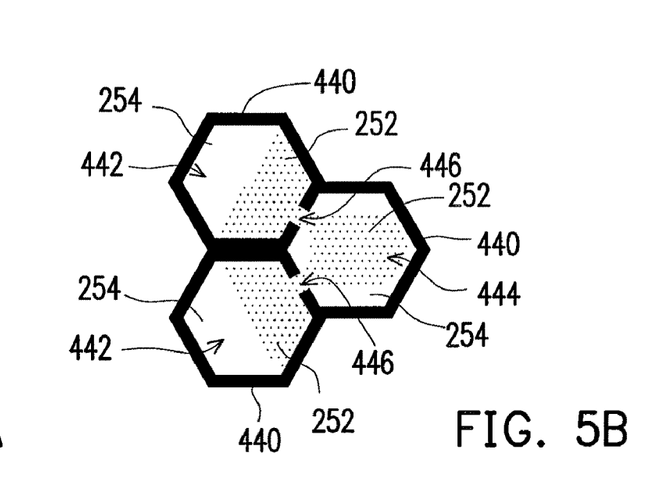
Figure 5C:
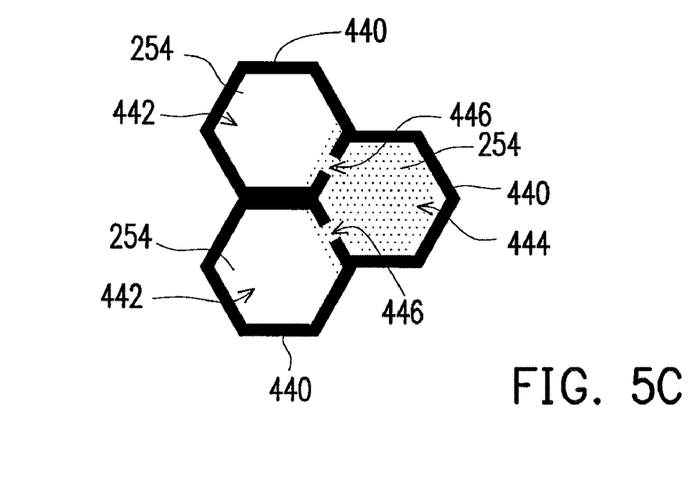
Figure 5D:
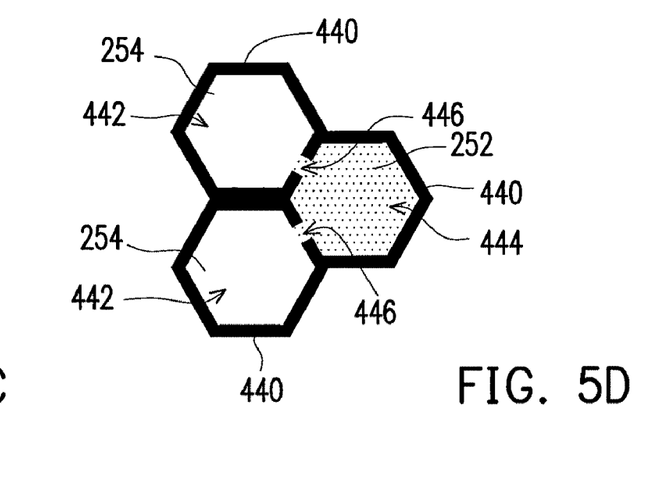

FIGS. 5A~5D are flowcharts illustrating how the pixel regions are driven according to the second embodiment of the present invention. Referring to FIG. 5A, when the electro-wetting display panel 400 is not driven, namely, when no bias is supplied between the first electrodes 212 and the second electrodes 232, the color fluid 252 in the pixel regions 442 fills up the entire pixel regions 442 and is in contact with the insulator layer 220. The colorless fluid 254 is located above the color fluid 252, and the colorless fluid 254 fills up the entire common reservoirs 444, as shown in FIG. 4B and FIG. 5A. Next, referring to FIG. 4A and FIGS. 5B~3D, when the electro-wetting display panel 400 is driven, an electric field is produced at the interconnections 443 between the common reservoirs 444 and the pixel regions 442 (i.e. the overlaps between the first electrodes 212 and the second electrodes 232). Thus, partial charge accumulation is caused on the colorless fluid 254 and accordingly the surface tension characteristic of the colorless fluid 254 is changed so that the color fluid 252 in the pixel regions 442 is pushed to the common reservoirs 444, as shown in FIG. 5D. The pushing effect is referred as an electro-wetting effect. In other words, the color fluid 252 can flow between the common reservoirs 444 and the pixel regions 442 through the apertures 446 connecting the pixel regions 442 and the common reservoirs 444. In the present embodiment, the capacity of the common reservoirs 444 is sufficient for accommodating the color fluid 252 in the pixel regions 442 connected to the common reservoirs 444.

In the present embodiment, a design of the common reservoirs 444 for accommodating the color fluid in the pixel regions is adopted in the electro-wetting display panel 400 such that the color fluid 252 can flow between the pixel regions 442 and the common reservoirs 444 when the electro-wetting display panel 400 is driven. Compared to the conventional technique, the electro-wetting display panel 400 having the common reservoirs 444 offers better aperture ratio and higher image contrast ratio. Moreover, the electro-wetting display panel 400 allows the color fluid 252 to move towards a predetermined direction so that the driving stability is improved.

Third Embodiment

Figure 6:
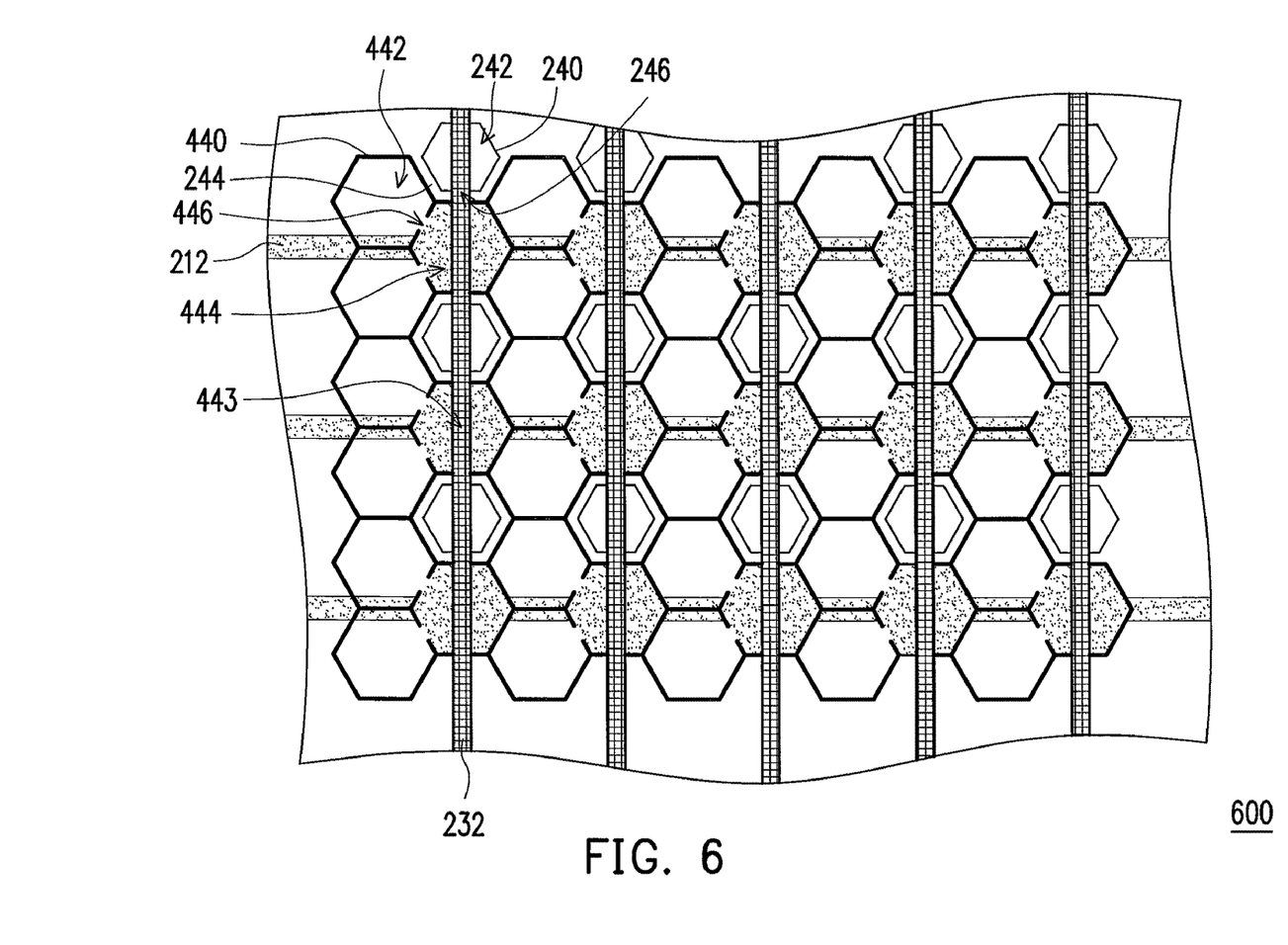
FIG. 6 is a partial view of an electro-wetting display panel according to a third embodiment of the present invention.

FIG. 6 is a partial View of an electro-wetting display panel according to the third embodiment of the present invention. Referring to FIG. 6, the structure of the electro-wetting display panel 600 is similar to that of the electro-wetting display panel 200 or 400, wherein like reference numerals refer to like elements. The difference between the electro-wetting display panel 600 and the electro-wetting display panel 200 or 400 is that the electro-wetting display panel 600 has a combined design of the partitioning structures in the electro-wetting display panel 200 and the partition in the electro-wetting display panel 400, as shown in FIG. 2A, FIG. 4A, and FIG. 6.

To be specific, when the electro-wetting display panel 600 is driven, the color fluid 252 in some of the pixel regions 242 is stored into the flow channels 244 through the aperture 246 according to the design of the partition structures 240, and the color fluid 252 in some of the pixel regions 442 is stored into the common reservoirs 444 through the apertures 446 according to the design of the partition 440. In other words, the designs described in foregoing embodiments may be combined to form the electro-wetting display panel 600 in order to improve the aperture ratio of a electro-wetting display panel. The electro-wetting display panel 600 described above is merely an example of the present invention, and which may also be formed by combining foregoing embodiments differently, namely, the design of the electro-wetting display panel 600 is not limited in the present invention.

In summary, the electro-wetting display panel provided by the present invention has at least following advantages. First, flow channels are formed by disposing the partitioning structures surrounding the pixel regions, and the color fluid in the pixel regions is pushed into the flow channels through the electro-wetting effect and the capillarity effect of the flow channels when the electro-wetting display panel is driven. Accordingly, the electro-wetting display panel can provide a higher aperture ratio. Moreover, the pixel regions and the common reservoirs are formed by a partition such that the color fluid in the pixel regions is pushed into the common reservoirs through the apertures connecting the pixel regions and the common reservoirs by the electro-wetting effect when the electro-wetting display panel is driven. Accordingly, the electro-wetting display panel can provide a higher aperture ratio. Furthermore, through different structure designs and electrode dispositions, the color fluid moves towards a predetermined direction so that the driving stability of the electro-wetting display panel in pixel can be improved. Similarly, the electro-wetting display panel formed by combining foregoing structures also has foregoing advantages.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electro-wetting display panel, comprising:
  a first substrate having a plurality of first electrodes;
  a second substrate having a plurality of second electrodes, the second substrate being located opposite side with the first substrate;
  an insulator layer disposed on the first substrate to cover the first electrodes, wherein the insulator layer is disposed between the first electrodes and the second electrodes and provides a capacitance accumulation effect;
  a plurality of partitioning structures disposed on the insulator layer, wherein each of the partitioning structures respectively defines a pixel region, and at least one of the partitioning structures has a flow channel surrounding the pixel regions, and the flow channel is connected to one of the pixel regions correspondingly; and
  a plurality of electro-wetting display mediums located in the pixel regions and the flow channels, wherein the electro-wetting display mediums flow between the pixel regions and the flow channels when the electro-wetting display mediums are driven by the first electrodes and the second electrodes.

2. The electro-wetting display panel according to claim 1, wherein the first electrodes comprise transparent electrodes, metal electrodes, conductive polymer electrodes, reflective electrodes, or transflective electrodes.

3. The electro-wetting display panel according to claim 1, wherein the second electrodes comprise transparent electrodes, metal electrodes, conductive polymer electrodes, reflective electrodes, or transflective electrodes.

4. The electro-wetting display panel according to claim 1, wherein the interconnections between the flow channels and the pixel regions are located at the overlaps between the first electrodes and the second electrodes, where the electric charge applied.

5. The electro-wetting display panel according to claim 1, wherein a number of the interconnections is greater than or equal to 1.

6. The electro-wetting display panel according to claim 1, wherein each of the electro-wetting display mediums comprises:
a color fluid disposed on the insulator layer, wherein the color fluid flows between the pixel regions and the flow channels when the color fluid is driven by the first electrodes and the second electrodes; and
a colorless fluid, in contact with the color fluid and the second electrodes.

7. The electro-wetting display panel according to claim 6, wherein the insulator layer is a hydrophobic insulator layer, the color fluid is a hydrophobic color fluid relative to contacted structure, and the colorless fluid is a hydrophilic colorless fluid relative to contacted structure.

8. The electro-wetting display panel according to claim 7, wherein the hydrophobic color fluid comprises ink containing pigment or dye.

9. The electro-wetting display panel according to claim 7, wherein the hydrophobic color fluid comprises a liquid crystal material having light-scattering characteristic.

10. The electro-wetting display panel according to claim 7, wherein the hydrophilic colorless fluid comprises water, water solution, or consolute solution containing solvents.

11. The electro-wetting display panel according to claim 1, wherein the flow channel is sufficient for accommodating the color fluid in the pixel region defined by each of the partitioning structures.

12. The electro-wetting display panel according to claim 1, wherein the partitioning structure having the flow channel comprises:
an internal partitioning structure for defining the pixel region, wherein the internal partitioning structure has at least an aperture; and
an external partitioning structure surrounding the internal partitioning structure so as to define a flow channel between the internal partitioning structure and the external partitioning structure, wherein the flow channel and the pixel region are connected to each other through the aperture.

13. The electro-wetting display panel according to claim 1, wherein the partitioning structures are a plurality of hydrophilic partitioning structures.

14. The electro-wetting display panel according to claim 1, wherein the partitions are disposed between the insulator layer and the second substrate.

15. An electro-wetting display panel, comprising:
a first substrate having a plurality of first electrodes;
a second substrate having a plurality of second electrodes, the second substrate being located opposite side with the first substrate;
an insulator layer disposed on the first substrate to cover the first electrodes, wherein the insulator layer is disposed between the first electrodes and the second electrodes and provides a electric capacitance accumulation effect;
a partition disposed on the insulator layer, wherein the partition defines a plurality of pixel regions and a plurality of common reservoirs, and the common reservoirs are connected to at least two pixel regions; and
a plurality of electro-wetting display mediums located within the pixel regions, wherein the electro-wetting display mediums flow between the pixel regions and the common reservoirs when the electro-wetting display mediums are driven by the first electrodes and the second electrodes.

16. The electro-wetting display panel according to claim 15, wherein the first electrodes comprise transparent electrodes, metal electrodes, conductive polymer electrodes, reflective electrodes, or transflective electrodes.

17. The electro-wetting display panel according to claim 15, wherein the second electrodes comprise transparent electrodes, metal electrodes, conductive polymer electrodes, reflective electrodes, or transflective electrodes.

18. The electro-wetting display panel according to claim 15, wherein the partition located around each of the common reservoirs has at least two apertures, and each of the common reservoirs is connected to the pixel regions through the apertures.

19. The electro-wetting display panel according to claim 15, wherein the interconnections between the common reservoirs and the pixel regions are located at the overlaps between the first electrodes and the second electrodes, where the electric charge applied.

20. The electro-wetting display panel according to claim 15, wherein each of the electro-wetting display mediums comprises:
a color fluid, disposed on the insulator layer, wherein the color fluid flows between the pixel regions and the flow channels when the color fluid is driven by the first electrodes and the second electrodes; and
a colorless fluid, in contact with the color fluid.

21. The electro-wetting display panel according to claim 20, wherein the insulator layer is a hydrophobic insulator layer, the color fluid is a hydrophobic color fluid relative to contacted structure, and the colorless fluid is a hydrophilic colorless fluid relative to contacted structure.

22. The electro-wetting display panel according to claim 21, wherein the hydrophobic color fluid comprises ink containing pigment or dye.

23. The electro-wetting display panel according to claim 21, wherein the hydrophobic color fluid comprises a liquid crystal material having light-scattering characteristic.

24. The electro-wetting display panel according to claim 21, wherein the hydrophilic colorless fluid comprises water, water solution, or consolute solution containing solvents.

25. The electro-wetting display panel according to claim 22, wherein each of the common reservoirs is sufficient for accommodating the color fluid in the pixel regions connected to the common reservoir.

26. The electro-wetting display panel according to claim 1, wherein the partition comprises a plurality of hydrophilic partitions.

27. The electro-wetting display panel according to claim 1, wherein the partition is disposed between the insulator layer and the second substrate.

* * * * *